March 10, 1931. A. H. PLEASANTS 1,795,796
LOCATING DEVICE FOR MAPS
Filed Nov. 22, 1919  3 Sheets-Sheet 1
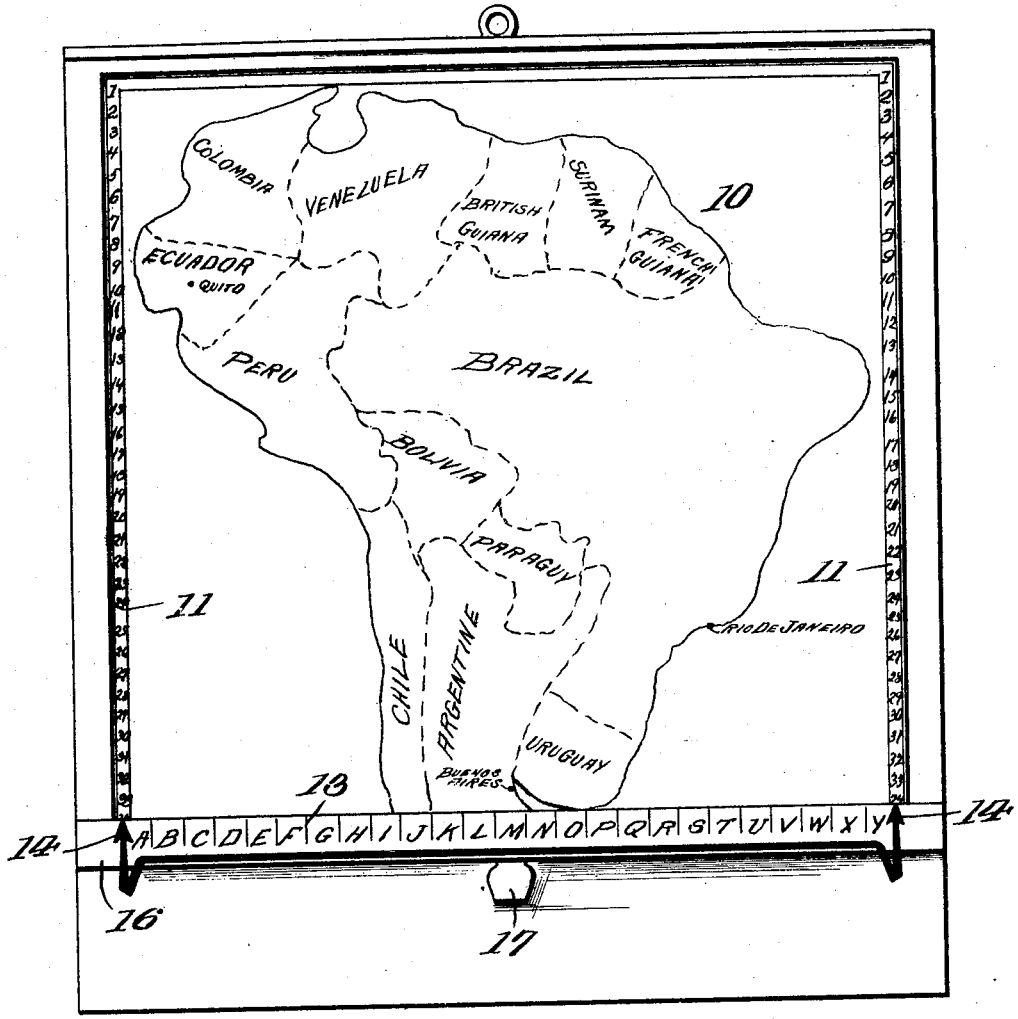
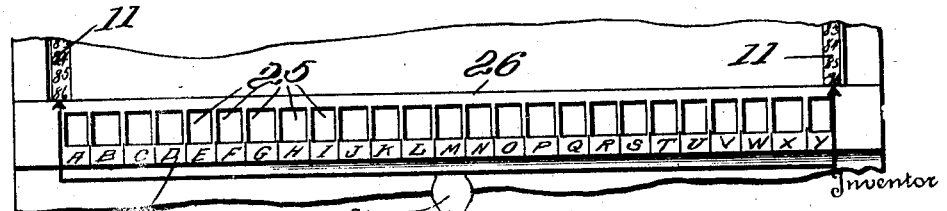

March 10, 1931. A. H. PLEASANTS 1,795,796
LOCATING DEVICE FOR MAPS
Filed Nov. 22, 1919   3 Sheets-Sheet 2
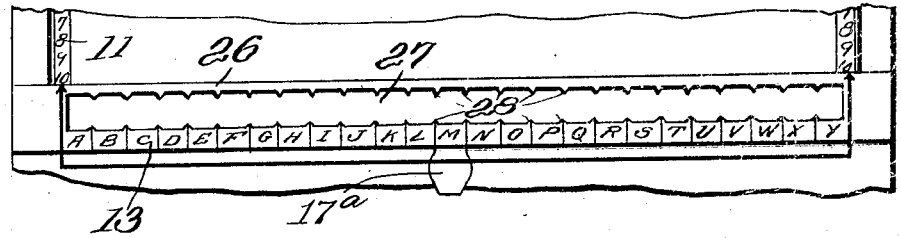
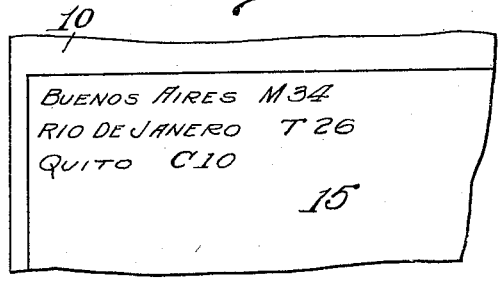
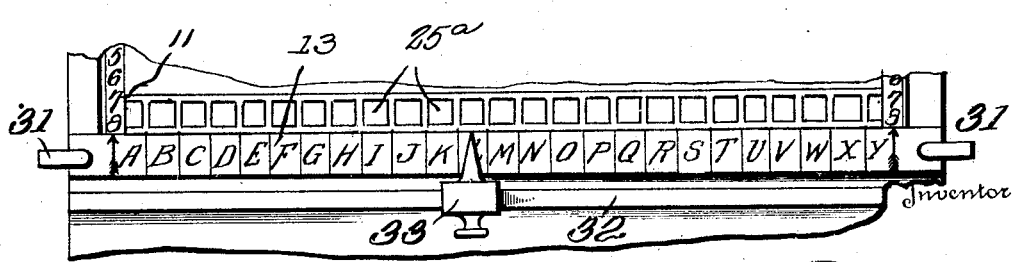

March 10, 1931.  A. H. PLEASANTS  1,795,796
LOCATING DEVICE FOR MAPS
Filed Nov. 22, 1919  3 Sheets-Sheet 3
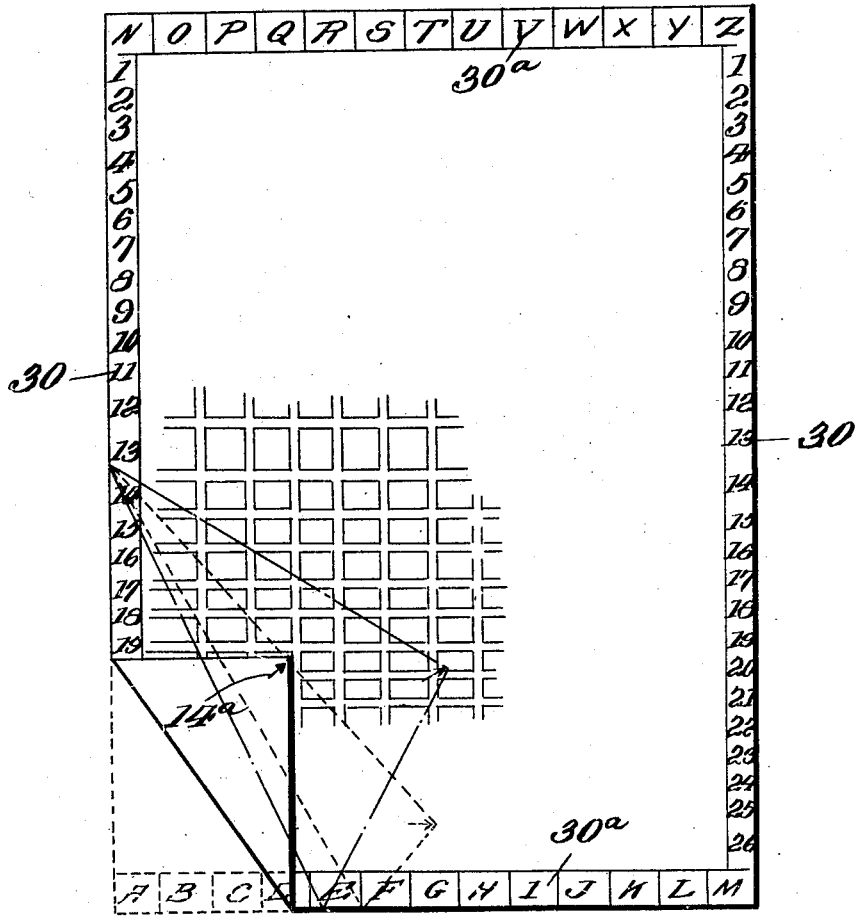
Inventor
Arthur H. Pleasants
By Wm. E. Hodges
Attorney Patented Mar. 10, 1931

1,795,796

UNITED STATES PATENT OFFICE

ARTHUR H. PLEASANTS, OF BALTIMORE, MARYLAND

LOCATING DEVICE FOR MAPS

Application filed November 22, 1919. Serial No. 340,077.

This invention is a locating attachment for maps, charts, diagrams, and the like.

Heretofore it has been a common practice to provide one or both of the side margins of a map with indicia, such as spaced apart numbers, and the top and bottom margins with indicia such as spaced apart letters or vice versa. For the purpose of assisting in locating various points on the map, a key is provided which contains a list of the names of all of said points, each name being associated with a letter and a number taken from the respective marginal indicia. This arrangement indicates that the place of the particular name correlated with the letter and number, is located approximately at the intersection of imaginary lines running inwardly from the margins, in register with the designated number and letter, and at right angles to each other. Such an arrangement is very useful but it is open to the objection, that the position is only approximately indicated and the eye can not always readily pick out and locate the place sought.

The object of the invention is to overcome the objection above mentioned by providing simple means whereby a portion of the marginal indicia is so positioned that it may be moved over the face of the map so that the two coordinates are brought together and the eye is automatically directed to the point sought.

The invention will be hereinafter fully set forth and particularly pointed out in the claims.

In the accompanying drawings:—

Figure 1 represents a face view of a map provided with the invention. Figure 2 is a detail view illustrating a portion of a reenforced marginal edge. Figure 3, illustrates the key. Figures 4, 5, 6, 7, and 8, are views illustrating various modifications.

Referring to Figure 1 of the drawing, 10 designates a map which may embody any territorial area desired, a map of South America having been selected for the purpose of illustration, the same being shown merely in outline. It is to be understood, however, that the invention is not limited to any particular style or kind of map, being equally applicable to maps of large or small areas irrespective of the character of the picture employed to portray the area. Arranged vertically along the side margins of the map are two rows of spaced apart numbers indicated at 11, each row being a duplicate of the other and shown as numbered consecutively from the top to the bottom of the map. Although numbers have been selected for this marginal indicia, it will be understood that letters may be employed instead and that they may be arranged consecutively from the top to the bottom or from the bottom to the top as may be preferred. The characters of the respective rows may be spaced apart to any desired degree, but it is preferred to place them as close together as possible, to insure a maximum range of utility for the invention.

The lower edge of the map is provided on its under side with movable indicia 13 extending the full width of the map, and in the form shown consisting of a series of letters alphabetically arranged consecutively from one side to the other. The letters are arranged in spaces or boxed so as to limit the area that the eye must cover, thereby tending to localize the position sought. It is to be understood that if the marginal indicia 11 consists of letters the bottom indicia 13 will then consist of consecutively arranged numbers. For the purpose of assisting the operator in guiding the indicia 13 along the columns 11, in proper juxtaposition with respect to the latter indicia indicating devices 14, are provided, positioned to register with said columns.

In connection with the indicia 11 and 13, a printed key 15 is employed. Said key consists of a list of places appearing upon the map, each place having associated therewith a character taken from the indicia 13 (a letter in the instance shown), and a character taken from the marginal indicia 11, (a number in the instance shown), to indicate the location on the map, of the particular place with which the number and letter are associated. For instance, Buenos Aires is indicated as M—33, Rio de Janeiro as T—25, Quito as C—10. Assuming that it is desired to locate Buenos Aires for instance, the lower edge of the map is folded over so as to bring the indicia in a position transversely across the map, and then said lower edge is moved upwardly until it registers with the number 33 of the indicia 11, the indicating devices 14 serving to aid the eye in maintaining said lower edge squarely across the map. The letter M of the indicia 13 will thus be arranged in close proximity to the position of Buenos Aires on the map and the eye is automatically directed thereto.

It is preferred, although not necessary, to reenforce the lower marginal edge of the map in a suitable manner for convenience in manipulating it over the surface of the map. For purposes of illustration the margin is shown as reenforced by strip 16 on which the indicia 13 are printed, said strip being provided with a small tab 17 which may be conveniently grasped between the thumb and fingers for the purpose of moving the reenforced portion over the map.

In Figure 4 is illustrated a slight modification for assisting the eye in localizing any particular point sought. In this form of the invention, the movable indicia 13 are arranged along one edge of a series of openings 25, one for each character. By moving the bottom edge 26 into register with the proper characters of indicia 11, a glance at the key letter of indicia 13 will bring the eye to the opening indicated by said key letter, and because of the relatively small area of the map exposed through said opening, the point sought may be quickly located. A similar arrangement is illustrated in Figure 5 in which the characters 13 are shown as extending along a slot 27, the edges of which are provided with projections 28 which will assist the eye in localizing the point sought. It is obvious, however, that these projections may be omitted. Both forms illustrated in Figures 4 and 5 respectively, are provided with a tab 17a for convenient manipulation of the lower edge of the sheet.

In the modification illustrated in Figure 7, the characters 30a are arranged along the top and bottom edges on the outer face of the sheet. In the drawing the lower left hand corner is shown folded over to various positions corresponding to the key characters, the indicator 14a directing the eye to the point sought to be located. The other corners may be folded in a similar manner.

For use in connection with very large maps it is preferred to provide the lower portion of the sheet with clips 31 capable of gripping or otherwise engaging the sides of the sheet to retain the lower edge with indicia 13 in line with the desired character of indicia 11. See Figure 6. Arranged parallel with the indicia 13 is a guide bar 32 on which is mounted a slidable pointer 33. Provision is made, preferably by frictional engagement, whereby said pointer is retained in any position along said bar, to which it may be moved. In practice the strip 32 serves as a reenforcement for the lower edge of the map, which edge is brought into register with the proper key characters 11 and secured in that position by means of the clips 31. The pointer 33 is then moved along the bar 32 until it registers with the proper key character of indicia 13, thereby indicating the point sought to be located. Said pointer 33 may also be used in the same manner as the tab 17 of Figure 1, for the purpose of moving the lower edge of the sheet over the map.

From what has been said it will be readily understood that by means of the invention, the two coordinates by which the various points may be located are brought into juxtaposition, and that one of said coordinates establishes a definite tangible line instead of an imaginary one, as in the old method, thereby automatically directing the eye to the point sought to be located. Nothwithstanding the fact that the invention, for purposes of illustration, has been disclosed as specifically applied to maps, it is not limited to this particular use, but may be employed in connection with charts, diagrams, or other arrangements of compiled information. It is also to be understood that although the index characters are illustrated and described as consisting of letters and numerals, the invention is not limited to the use of any particular style of characters for this purpose, but contemplates the use of characters of any kind within the scope of the appended claims, capable of use in connection with a key of correlated indicia of the type herein above described.

Having thus explained the nature of the invention and described an operative manner of constructing and using the same, although without attempting to set forth all of the forms in which it may be made, or all of the forms of its use, what is claimed is:—

1. Locating means of the character described comprising a sheet of flexible material having a plurality of consecutively arranged index characters on its top face, a plurality of consecutively arranged index characters on its under face movable over the top face and the first mentioned characters when the sheet is folded, and means contiguous to the second set of characters and correlated therewith for framing the respective areas indicated by said characters.

2. Locating means of the character described comprising a sheet of flexible material having a plurality of consecutively arranged index characters on its top face, a plurality of consecutively arranged index characters on its under face movable over the top face and the first mentioned characters when the sheet is folded, said sheet being provided with openings contiguous to and registering with the second set of index characters for framing the areas indicated thereby.

3. Locating means of the character described comprising a sheet having locating indicia on one margin, a reenforcing strip secured to one edge of the sheet at right angles to the margin, said reenforcing strip carrying locating indicia correlated with the first mentioned indicia and positioned to be moved over the face of the sheet in juxtaposition with the first mentioned indicia, and a tab retained in position by said reenforcing strip.

4. Locating means of the character described comprising a sheet of flexible material having a plurality of consecutively arranged index characters on one face, a plurality of consecutively arranged index characters also arranged on said sheet and so disposed as to be movable over the first mentioned characters when the sheet is folded, and means contiguous to the second set of characters and correlated therewith for framing the respective areas indicated by said characters.

5. Locating means of the character described comprising a flexible sheet having locating indicia on its top face, correlated indicia on the under face of said sheet and movable over the top face and the first mentioned indicia by folding the sheet, means for reenforcing said sheet contiguous to the indicia carried by the under face of the sheet, and a tab retained in position by said reenforcing means.

In testimony whereof I have hereunto set my hand.

ARTHUR H. PLEASANTS.